United States Patent Office 2,764,574
Patented Sept. 25, 1956

2,764,574

OXIDATIVELY DRYING PREPARATIONS AND PRODUCTS MADE THEREFROM

Gustav Widmer, Basel, and Paul Zuppinger, Binningen, Switzerland, assignors to Ciba Limited, Basel, Switzerland, a Swiss firm No Drawing. Application November 25, 1952, Serial No. 322,552

Claims priority, application Switzerland November 28, 1951

9 Claims. (Cl. 260—67.6)

This invention provides an oxidatively drying preparation which comprises a hardenable formaldehyde condensation product of an aminotriazine containing at least two $NH_2$-groups and a metallic drier, in which condensation product at least two methylol groups per mol. of aminotriazine are etherified with allyl groups. More especially the invention provides a preparation capable of drying in the air at room temperature or in an oven, which preparation contains the allyl ether and a drier of a metal of the iron group of the periodic system, especially a cobalt drier. The invention also includes coatings, films, castings or like products produced from such preparations.

It has already been proposed to polymerize urea-formaldehyde condensation products modified with allyl alcohol or methallyl alcohol with the aid of peroxidic catalysts in an acid medium at a raised temperature, whereby products are obtained which are harder and tougher than those obtainable from urea-formaldehyde condensation products modified with saturated lower alcohols. If, however, it is attempted to dry these allyl-modified urea-formaldehyde condensation products in air at room temperature there are obtained with cobalt and many other metallic driers or with peroxides or mixtures of the latter with a cobalt drier rapid drying coatings, but these coatings remain thermoplastic and are easily scratched, and they are attacked by water in a few seconds and are immediately dissolved by solvents, for example, alcohols.

The present invention is based on the unexpected observation that polyallyl ethers of aminotriazine-formaldehyde condensation products, especially those of methylol melamines, behave quite differently. They are not acted upon by peroxides in the cold and only slightly at a raised temperature, and therefore they cannot be polymerized to useful artificial products. On the other hand, in the presence of cobalt compounds they exhibit even at room temperature very great readiness to polymerize and yield, for example, air-drying coatings which become dust-dry and pressure-resistant after a few hours, and become scratch-resistant and to a great extent insoluble in solvents and water at the latest after a few days.

By heating, for example, at 80° C. for one hour, this drying process can be very greately accelerated. Whereas at room temperature only a few metallic driers can be used satisfactorily, apart from cobalt, for example, iron and nickel driers, which latter however require longer drying periods, it is possible at a raised temperature to use other known metallic driers, especially chromium, aluminium, calcium or zinc driers.

The drying can easily be recognized as a surface reaction proceeding under the influence of atmospheric oxygen. Thus, it can be shown that the coatings undergo an increase in weight after drying, and also that castings containing cobalt do not dry in an atmosphere of carbon dioxide, that is to say, with the exclusion of atmospheric oxygen.

The drying can be further accelerated by an addition of a peroxide, especially an organic peroxide, such as benzoyl peroxide, di-tertiary-butyl peroxide, lauryl peroxide, hydroxycyclohexyl hydroperoxide or the like. For example, a coating of a methylol-melamine allyl ether, which contains 0.1 per cent. of cobalt drier and 2 per cent. of benzoyl peroxide, becomes dust-dry in the course of 5 hours at room temperature, whereas without the peroxide a period of 10–12 hours is necessary for drying. By increasing the quantity of the metallic drier or of the peroxide the drying period can be further shortened.

The presence of both metallic driers and peroxidic catalysts may, especially at raised temperature, lead to polymerization in the interior of the mass in addition to the above described surface reaction.

Poly-allyl ethers of formaldehyde condensation products of aminotriazines, especially melamine, are distinguished by being compatible with many of the usual binding agents and solvents used in the manufacture of artificial resin masses and solutions. It has been unexpectedly found that the aforesaid capacity for oxidative polymerization and the drying properties of these allyl ethers usually persist in admixture with such binding agents and solvents. The addition of such allyl ethers, for example, to coating preparations produced with the usual binding agents yields coatings or films, of which the hardness, gloss and occasionally also the fastness to light are generally considerably better than those of coatings obtained without the addition of the allyl ether. It will be understood that apart from the said coating preparations analogous preparations for casting, pressing, laminating, for use in the manner of putty, for impregnating, cementing, adhesion or the like can be improved in a similar manner by the addition of the allyl ethers of aminotriazines. The products so obtained usually exhibit greater surface hardness, abrasion resistance, and better resistance to water, solvents and chemicals than products prepared without the addition of the allyl ethers. Of special interest is the use of the allyl ethers with binding agents containing oil, which in use respond to the action of driers and therefore possess air-drying properties. By the use of drying oils such as linseed oil, dehydrated castor oil, soya bean oil, wood oil, and also alkyd resins, styrolized oils and the like the final hardness of coatings or films produced therewith is increased by the addition of the allyl ethers. In the case of oils which exhibit after-tackiness when air-dried, this disadvantage can be overcome or reduced by the addition of the allyl ethers. Such films also exhibit an improved resistance to water and solvents.

Also, nitrocellulose, acetyl-cellulose, ethyl cellulose, polyvinyl acetate, polyvinyl acetals, polystyrenes and similar thermoplastic substances, solutions of which do not dry of themselves oxidatively in the air or in an oven like the oil-containing binding agents mentioned above, but dry by the mere loss of solvent can be improved by the addition of methylol-aminotriazine allyl ethers, especially with respect to the hardness of coatings or films produced therewith. Furthermore solvent-free preparations which contain such a thermoplastic substance, an aminotriazine allyl ether, especially one having a high content of allyl groups and a metallic drier and, if desired, a softening agent, can be worked up in known manner and hardened in the air at room temperature or at raised temperature to yield products which are harder at their surface than in their interior and possess a noteworthy resistance to abrasion.

Accordingly, the invention includes not only air-drying and oven-drying preparations which contain allyl ethers of the aforesaid kind alone, but also preparations in which the allyl ether is used as an addition to an ordinary binding agent. In the latter case the proportion of the added allyl ether may vary within wide limits depending on the properties of the other binding agent and the requirements which the preparation is intended to fulfil. It will be understood that the preparations may also contain solvents and/or additions having a modifying action, such as softeners, organic or inorganic filling materials, pigments or the like.

For the purpose of the invention there come into consideration hardenable formaldehyde condensation products of aminotriazines containing at least two NH2 groups, in which condensation products at least two methylol groups per mol of aminotriazine are etherified by allyl or methallyl groups, and which condensation products can be prepared in known matter. Thus, in general all aminotriazines can be used which contain at least two NH2 groups, insofar as they can be converted into the corresponding methylol compounds with formaldehyde and subsequently etherified. For reasons of economy it is desirable to use the most easily accessible products such as melamine, and also N-phenyl-melamine, benzoguanamine, acetoguanamine, formoguanamine, ammeline, 2:4-diamino-6-chloro-1:3:5-triazine or the like. It is obvious and known to the expert that allyl ethers having different contents of allyl groups can be made depending on the choice of the starting materials, the relative proportions thereof and the conditions of preparation. There may also be used mixed ethers which contain saturated alkyl ether groups in addition to allyl ether groups and which can be obtained in known manner, for example, by the partial re-etherification of methylol-aminotriazine ethers containing saturated alkyl ether groups with allyl alcohol or methallyl alcohol or by the partial re-etherification of methylol-aminotriazine allyl ethers having a high content of allyl groups with monohydric or polyhydric alcohols having a higher boiling point than allyl alcohol, for example, butanol, ethylene glycol, octadecyl alcohol, myricyl alcohol, incompletely etherified or esterified glycerine or other substances containing hydroxyl groups. It is also possible to use methylol-aminotriazine allyl ethers obtainable by methods in themselves known, in which methylol groups are esterified with organic acids such as saturated or unsaturated fatty acids, resin acids or other compounds containing carboxyl groups.

The invention also includes preparations, which are obtainable by polymerizing a mixture containing, on the one hand, a methylol-aminotriazine allyl ether and, on the other, a polymerizable unsaturated compound, such as vinyl acetate, styrene, methacrylic acid ester, an unsaturated alkyd resin or ester resin, a drying oil or the like. Preparations made with such components generally yield very valuable products.

The polyallyl ethers of aminotriazine-formaldehyde condensation products used in this invention are usually very stable products. They can be stored at room temperature and at pH values above 7 for long periods without undergoing change.

In the case of preparations which are to be dried in air at room temperature there are advantageously used products having a large content of allyl groups, whereas in the case of oven-drying preparations products having a lower content of allyl groups are likewise suitable, which dry rapidly at a raised temperature, probably owing to the presence of methylol groups.

By drying in air at room temperature or in an oven, coatings, films and like products obtained from the polyallyl ethers alone mixed with a cobalt drier, there are usually obtained odorless, water-clear, water-resistant products which are insoluble in organic solvents, fast to light and exhibit a very high final hardness. Their drying period in air (about 10–48 hours) can be considerably shortened, for example, to a few hours, by pre-polymerizing the starting products, for example, by blowing with air at 150° C., whereby the viscosity of the products is increased. The drying period in the presence, for example of a cobalt drier, can also be considerably shortened, for example, by one half, by the addition of peroxide catalysts, although this expedient alone may little be effective or not at all.

The examples given hereinafter illustrate the invention, the parts and percentages being by weight, and the allyl ethers used in the examples being prepared in known manner, for example, as follows:

PRODUCT I (METHYLOL-MELAMINE ALLYL ETHER)

648 parts of hexamethylol melamine are stirred well with 2580 parts of allyl alcohol in a flask fitted with stirring means with the addition of about 237 parts of hydrochloric acid of 36 per cent. strength for one hour at 25° C. The mixture is then rendered neutral to Brilliant Yellow-Orange Red with calcined sodium carbonate (about 235 parts), and then the salt formed is filtered off and washed with allyl alcohol. From the clear filtrate a mixture of allyl alcohol and water is distilled under a pressure of about 400 mm. of mercury. Finally the product is completely dehydrated by heating it in an oil bath at an internal temperature of about 105° C. and under reduced pressure. The turbid syrup is filtered in the cold after being allowed to stand for several hours. There are obtained 883 parts of a water-clear syrup, which consists of approximately 100 per cent. of an allyl ether which contains about five allyl ether groups per mol of melamine.

PRODUCT II (METHYLOL UREA ALLYL ETHER)

300.25 parts of urea, 25.6 parts of allyl alcohol, 1000 parts of a solution of 30 per cent. strength of paraformaldehyde in allyl solution and about 50 parts of ethylene dichloride are introduced into a three-necked flask provided with stirring means, a thermometer and a fractionating column. The ethylene dichloride serves for removing water in the form of an azeotropic mixture. The fractionating column has connected thereto a separator for separating the water from the ethylene dichloride. The reaction mixture is heated to the refluxing temperature and maintained at that temperature until no further reaction can be observed. The vapors condensed in the condenser are collected in the water separator, in which an aqueous layer and a lower layer of solvent are formed. The aqueous layer is led away and the solvent layer is returned into the fractionating column. After heating for about ½ hour there are added about 3 parts of formic acid, and the mixture is then further heated for about 2½ hours, during which period about 60 per cent. of water calculated on the urea, are removed. After removing the water separator, the ethylene chloride is distilled off completely and the excess of allyl alcohol is distilled off as far as possible. The resulting product is mixed twice with about one third of its volume of toluene, and the toluene is distilled off after each occasion. The product which remains behind is then adjusted to a dry content of 70 per cent. with a mixture of equal parts of toluene and butanol.

PRODUCT III (METHYLOL-MELAMINE ALLYL ETHER)

In the manner described for Product II there is prepared from 252 parts of melamine, 390 parts of paraformaldehyde and 871 parts of allyl alcohol a solution, adjusted to a dry content of 70 per cent, of a methylol melamine allyl ether which contains about three allyl ether groups per mol of melamine.

PRODUCT IV (METHYLOL-MELAMINE ALLYL ETHER)

120 parts of para-formaldehyde are dissolved with the aid of heat in 1200 parts of allyl alcohol, and 126 parts of melamine are added to the solution. The mixture is then heated at the boiling temperature and maintained at that temperature for about 4 hours, and then evaporated under reduced pressure until it loses its odor. In this manner there is obtained a resin containing about two allyl ether groups per mol of melamine, which resin is soluble in organic solvents and is toughly viscous at room temperature.

PRODUCT V (METHYLOL-BENZOGUANAMINE ALLYL ETHER)

93.5 parts of benzoguanamine are dissolved with the aid of heat in 187 parts of an aqueous formaldehyde solution of 36.8 per cent. strength of which the pH value has been adjusted to 8.5. The solution is heated for 15 minutes at 90° C., and then evaporated under reduced pressure to form a thick syrup. To the resulting 175 parts of the product so obtained there are added 960 parts of allyl alcohol and 59 parts of aqueous concentrated hydrochloric acid, and then the mixture is stirred at 25° C. for one hour. After neutralizing the mixture with sodium carbonate the precipitated sodium chloride is separated by filtration, and water and also the excess of allyl alcohol are distilled off under reduced pressure. There are obtained 186 parts of a clear syrup which contains about two allyl ether groups per mol of benzoguanamine.

PRODUCT VI (METHYLOL-ACETOGUANAMINE ALLYL ETHER)

In the procedure described for Product V there are used 63 parts of acetoguanamine, instead of 93.5 parts of benzoguanamine, and 208 parts of formaldehyde solution, instead of 187 parts. In this manner there are obtained 160 parts of a water-clear syrup which on cooling passes into a salve-like condition and contains about two allyl ether groups per mol of acetoguanamine.

*Example 1*

Separator quantities of Products I, II, III and IV each containing 10 grams of dry substance are mixed with 10 milligrams of cobalt in the form of a cobalt naphthenate drier, and the mixture is diluted with toluene to a viscosity suitable for casting. Castings are produced on glass plates and allowed to stand at room temperature.

The coating with Product I is dust-dry in about 10 hours, and has well through-dried after a further 10–15 hours and is scratch-resistant in a few days. It is water-clear, has a good evenness and gloss, and has a good resistance to the action of water and solvents. These properties are further improved by longer drying. The hardness increases to about 70 Sward units (as compared with 100 Sward units for plate glass surfaces).

The coating with Product III dries in air free from tackiness in a few hours. After a few days it is scratch-resistant and then has properties similar to those of Product I.

The coating obtained with Product IV dries dust-dry in the course of ½ hour and has polymerized to such an extent after being exposed to the air for 18 hours at room temperature that it withstands immersion in water for one hour. On the other hand a coating prepared in the same manner, but without the addition of the cobalt drier, becomes white after immersion in water for one minute.

The coating obtained with Product II rapidly dries free from tackiness, but remains soft. Even after a drying period of 10 days it can be scratched with the finger nail and softens under the pressure of warm fingers. A drop of water produces a white spot in a few seconds, and after a few minutes the coating is completely softened and can be wiped off by the finger.

*Example 2*

Product I is taken up in xylene and mixed with 0.4 per cent. of lead and 0.08 per cent, of cobalt in the form of the naphthenates. The resulting coating composition yields a coating which is dust-dry in about 10 hours and in a few weeks contains a pencil scratch-hardness of over 9H and a Sward hardness of about 70.

By repeating the above procedure with the addition of 2 per cent. of benzoyl peroxide (calculated on the quantity of Product I) a cast coating is obtained which is dust-dry in about 5 hours and after a few weeks has a pencil scratch-hardness of about 9H and a Sward hardness of about 70.

By using in the above manner, calculated on the quantity of Product I, 0.1 per cent. of cobalt in the form of its naphthenate and 4 per cent. of benzoyl peroxide, a coating is obtained which is dust-dry in 3½ hours, whereas with the use of benzoyl peroxide alone, for example 5 per cent., drying does not take place.

*Example 3*

Preparations are made of which the film-forming constituent consists of 30 per cent. of Product I and 70 per cent. of an ordinary drying binding agent (calculated as dry substance), and which contain 0.2 per cent. of lead and 0.04 per cent. of cobalt in the form of the naphthenates, calculated on the total quantity of film-forming substances. The drying binding agent is dissolved in a suitable solvent. Then Product I and the drier are added, and the viscosity of the mixture is rendered suitable for casting by the addition of the solvent. The preparations so obtained are cast on to glass, and the drying process is observed at about 20° C. and about 85 per cent. relative humidity. The Sward hardnesses and resistances to solvents are determined after about 1½ to 3 months. The following results are obtained with the drying binding agents mentioned below:

(a) *Linseed oil for varnish.*—The film is dust-dry within about 4 hours, after a few days it is resistant to scratching by the nail and has a final hardness of 23 Sward units. It also remains clear after prolonged immersion in water. Upon immersion in an aqueous solution of sodium carbonate of 10 per cent. strength and in butyl acetate swelling of the film occurs at room temperature only after about 4 hours and after 7 minutes, respectively.

On the other hand varnish linseed oil alone (without Product I) and the drier yields a coating which exhibits after-tackiness when dried for several weeks in the air, and is soft and becomes dull after immersion in water for a few minutes. Its final hardness is about 13 Sward units. Upon immersion in an aqueous sodium carbonate solution of about 10 per cent. strength and in butyl acetate the film swells at room temperature after about 30 minutes and after one minute, respectively.

(b) *Dehydrated castor oil.*—The coating is dust-dry after about 2½ hours, possesses approximately the same properties as the analogous coating containing varnish linseed oil, and has a final hardness of about 19 Sward units.

A coating produced with dehydrated castor oil without the addition of Product I has properties similar to the analogous coating produced with varnish linseed oil alone. It has a final hardness of only about 7 Sward units.

(c) *The air-drying alkyd resin known in commerce as "Moxal 2225."*—The coating dries well in 24 hours, is nail-hard, resistant to water and solvents after a few days, and has a final hardness of about 60 Sward units. Upon immersion in an aqueous sodium carbonate solution of 10 per cent. strength, it swells after about 3 hours.

A coating which is analogously produced without using Product I possesses after the same drying period a Sward unit of 43 and, upon immersion in an aqueous sodium carbonate solution of 10 per cent. strength, swells already after 1½ hours.

(d) *Oil modified with styrene, known in commerce as "Cycopol 101-2."*—The coating has substantially the properties of the coating described under (c). Its final hardness is about 53 Sward units.

Example 4

In the manner described in Example 3 there are made preparations containing a drier from the following mixtures of film-forming binding agents:

(a) 50 per cent. of polyvinyl acetate and 50 per cent. of Product I, (b) 50 per cent. of polystyrene and 50 per cent. of Product I, (c) 50 per cent. of nitrocellulose and 50 per cent. of Product I, (d) 2 parts of a polyvinyl formal known in commerce as "Formvar" and 1 part of Product I.

Coatings produced on glass with the above preparations possess the following properties:

(a) The coating dries in about 10–15 hours to yield a nail-hard film.

On the other hand a coating produced without the addition of drier remains tacky after drying in air for several weeks.

(b) The coating dries in a manner analogous to the coating produced under (a) and attains a final hardness of about 33 Sward units.

(c) The cast film dries at 120° C. in the course of 20 minutes to form a water-clear, very tough coating resistant to scratching with the nail and very resistant to solvents, and the coating has a final hardness of about 61 Sward units.

(d) This preparation yields a coating which, after drying at room temperature for 10–15 hours, is extraordinarily tough and has a hardness of about 68 Sward units.

Results with regard to drying speed and final hardness similar to those under (a) and (b) are obtained by polymerizing a mixture of 50 parts of monomeric vinyl acetate or styrene and 50 parts of Product I together with 100 parts of toluene in known manner, for example, with the aid of benzoyl peroxide, and adding the drier to the product so obtained. The coatings and films produced therewith possess as compared with those of preparations (a) and (b) a better resistance to solvents.

Example 5

Two separate portions of 100 parts each of Product V and Product VI, after the addition of 10 parts of white spirit, are mixed with 0.1 part of cobalt in the form of its naphthenate.

The preparation obtained with Product V, when cast on a glass plate, dries after about 14 hours to a clear hard coating which is resistant to solvents. The preparation obtained with Product VI dries in the course of 3 days to give a matt film which is resistant to water and acetone.

Example 6

(a) A solution of a mixed polymerisate, prepared as described below, from varnish linseed oil, styrene and Product I in white spirit and xylene is mixed with 0.04 per cent. of cobalt and 0.2 per cent. of lead in the form of the naphthenate, calculated on the dry content of the mixture.

A small plank of pine wood is varnished three times on all sides with the above solution, and after being allowed to stand for one month at room temperature, is subjected to a rapid weathering test. For this purpose the plank is first subjected in a Weather-Ometer (Atlas Electric Devices Co., Chicago) for 20 hours alternately to illumination for 16 minutes and to illumination for 4 minutes with simultaneous irrigation with water, then placed for ½ hour in water at room temperature, and finally placed for one hour in a refrigerator at −20° C. This treatment is repeated 28 times. After this treatment the coating showed only three small fissures, and is otherwise completely unchanged and has its original gloss.

The mixed polymerisate used in the above example is prepared as follows:

50 parts of varnish linseed oil, 25 parts of styrene and 25 parts of Product I are heated in a round flask provided with stirring mechanism and a reflux condenser, after the addition of 2 parts of benzoyl peroxide, in an oil bath for 6 hours at an internal temperature of 160° C., and then further heated for 10 hours at 220° C. The unreacted styrene is then distilled off under reduced pressure while introducing nitrogen. The mixed polymerisate so obtained is then dissolved in a mixture of equal parts of white spirit and xylene, and the dry content of the solution is adjusted to 50–60 per cent.

(b) The procedure is the same as that described under (a), except that 50 parts of dehydrated castor oil are used instead of 50 parts of varnish linseed oil.

In this case also the coating on the pine wood plank is practically unchanged after the rapid weathering treatment.

(c) If in the procedures described under (a) and (b) there is used for preparing the mixed polymerisate 25 parts of styrene instead of 25 parts of Product I, and in other respect the procedure is the same as that described under (a), the coatings show a considerable formation of fissures after the rapid weathering treatment, and they are matt and whitish and partially destroyed.

Consequently, the use of Product I as described under (a) and (b) leads to a considerable improvement in the properties of such mixed polymerisates with respect to their value in the lacquer industry as shown by the rapid weathering treatment. The coatings of (a) and (b) are not tacky at a raised temperature, for example, at about 180° C., whereas the coating of (c) is very tacky even at 50–80° C. The resistance to solvents is also substantially improved by the use of Product I. The coating of (a) remains practically unaltered after immersion for 24 hours in butanol, butyl acetate or xylene, whereas the coating of (c) begins to dissolve in these solvents within a few minutes.

Example 7

100 parts of a mixed allyl-stearyl ether of methylolmelamine prepared as described at the end of this example are dissolved in 100 parts of toluene, and mixed with 0.04 part of cobalt in the form of its naphthenate. By casting the resulting solution on a sheet of aluminium there is obtained after heating for ¾ hour at 100° C. a transparent, colorless, elastic coating which is still capable of being scratched by the finger nail and which is completely insoluble in white spirit.

By immersing cotton gabardine in the aforesaid solution containing the drier, then squeezing the fabric until it contains about 12 per cent of resin (calculated on the dry weight of the fabric), and finally drying for 45 minutes at 100° C. or for 36 hours at room temperature, the fabric acquires a good water-repellent finish. This effect is further increased, if paraffin wax is also incorporated in the impregnating solution.

The mixed ether of methylol-melamine used in this example is prepared in a manner known for preparing such mixed ethers, as follows:

100 parts of Product I are mixed, while stirring, with 54 parts of stearyl alcohol with the addition of 0.05 part of formic acid of about 85 per cent strength, and the mixture is heated under a pressure of about 30 mm. of mercury for about 3½ hours at about 150° C. There are obtained 143 parts of a Vaseline-like, salve-like product, which contains about two allyl ether groups per mol of melamine.

Example 8

A solution of 100 parts of a methylolmelamine mixed ether prepared as described at the end of this example in 100 parts of white spirit is mixed with 0.04 part of cobalt and 0.2 part of lead in the form of the naphthenates. When the solution is cast on glass it leaves after about 1¼ hours a dust-dry film having valuable properties in the lacquer industry.

The above mentioned methylol melamine mixed ether is prepared as follows:

100 parts of Product I are heated with 200 parts of linseed oil fatty acid diglyceride and 1.5 parts of formic acid of 85 per cent strength, while stirring and introducing carbon dioxide, first for 8 hours under a pressure of about 90 mm. of mercury at 145° C., and then under a pressure of about 80 mm. of mercury for 6 hours at 200° C. The resulting 274 parts of resin of medium viscosity are obtained, which can be diluted with any desired quantity of white spirit.

*Example 9*

100 parts of a methylol melamine mixed ether, of which the preparation is described below, are dissolved in 100 parts of solvent naphtha and mixed with 0.04 part of cobalt in the form of its naphthenate. A coating produced with the resulting solution is dust-dry after one hour at room temperature. Even after one day the pencil scratch-hardness is 6H. On the other hand, a coating produced under the same conditions from a partially esterified polyether prepared as described below, but not reacted with Product I, has a pencil scratch-hardness of only 3H.

The methylol-melamine mixed ether used in this example is prepared as follows:

40 parts of a brittle resinous polyglycidyl ether obtained in known manner by reacting 228 parts of 4:4'-dihydroxydiphenyl-dimethylmethane and 148 parts of epichlorhydrin in the presence of aqueous caustic soda solution are reacted with 60 parts of dehydrated castor oil fatty acid for two hours at about 260° C. 75 parts of the resulting partially esterified polyether, having an acid number of 10 and a hydroxyl number of 42, are then heated with 25 parts of Product I after the addition of 0.5 part of formic acid of about 85 per cent strength, while stirring and introducing carbon dioxide, and under a pressure of about 260 mm. of mercury for about 12 minutes of about 150° C. There are obtained 95 parts of a mixed ether having a hydroxyl number of 25.

*Example 10*

55 parts of an unsaturated polyester, the preparation of which is described below, are mixed with 35 parts of freshly distilled styrene, in which 8 parts of hydroxycyclohexyl hydroperoxide (H—C—H catalyst) are dissolved, and with 10 parts of Product I, and the mixture is cooled to about 10° C. 0.01 part of cobalt in the form of its naphthenate is then added to the mixture.

Owing to the speed at which polymerization proceeds the preparation must be used within a short time. When cast, brushed or sprayed on to wood or metal it yields within 1½ hours, even when a thick layer is applied, a dust-dry glossy and practically colorless coating. Even in still thicker layers, for example, when cast in molds, the preparation polymerizes with the spontaneous evolution of heat, to yield molded products, such as balls, plates and the like, which are free from bubbles and fissures and have a high surface hardness. When the hard surface layer is mechanically removed, a surface is exposed which is initially softer than the original surface, but again forms a hard surface upon oxidation by the air.

The unsaturated polyester used in this example is prepared as follows:

A mixture of 98 parts of maleic anhydride, 148 parts of phthalic anhydride, 146 parts of glycol and 25 parts of benzyl alcohol is heated while stirring and introducing carbon dioxide for 6–7 hours at about 200° C. (internal temperature). The unsaturated, pale yellow polyester of medium viscosity so obtained has an acid number of 27.

*Example 11*

A mixture of 30 parts of Product I and 70 parts of polyester, obtained from 633 parts of diethylene glycol, 580 parts of fumaric acid and 202 parts of sebacic acid by heating for 7 hours at about 220° C. in an atmosphere of carbon dioxide, is mixed with 2 parts of benzoyl peroxide and 0.0033 part of cobalt in the form of its naphthenate.

The resulting preparation of medium viscosity can be applied well to a very wide variety of supports, such as metal or wood, and leaves after being heated for 45 minutes at about 100° C. a thorough-polymerized, highly glossy, colorless and elastic coating.

Layers of glass fabric impregnated with the above preparation and allowed to stand at room temperature for 1–2 hours or heated at about 100° C. for 3–5 minutes, are placed one upon the other, and then pressed under a pressure of 15 kilograms per square centimetre for 10 minutes at 95° C. to give a practically colorless, transparent and elastic laminate.

100 parts of the preparation described in the first paragraph of this example are mixed with 43 parts of pine wood meal, and the mixture is thoroughly kneaded. The plastic mass A so obtained can be worked well with a spatula and spread. After remaining for 14 hours at room temperature, it is so hard that it can be ground and painted. A plastic mass B prepared in an analogous manner, but without the cobalt drier, remains soft and tacky even after several days at room temperature. When the plastic masses A and B are separately molded under a pressure of 15 kilograms per square centimetre at 140° C. for 15 minutes, there are obtained molded bodies which initially possess the same mechanical and chemical properties and have a pencil scratch-hardness of about 7H. However, after being kept for 3 days at room temperature, the hardness of the body made from mass A increases to 9H, whereas the hardness of the body made from mass B remains practically unchanged.

What is claimed is:

1. An oxidatively drying preparation in which the drying ingredient consists of a hardenable formaldehyde condensation product of an aminotriazine containing at least two $NH_2$-groups and a metallic drier, in which condensation product at least two methylol groups per mol of aminotriazine are etherified with allyl groups.

2. An oxidatively drying preparation in which the drying ingredient consists of a hardenable formaldehyde condensation product of an aminotriazine containing at least two $NH_2$-groups and a metallic drier, in which condensation product at least two methylol groups per mol of aminotriazine are etherified with allyl groups and at least one further methylol group is etherified with another substance containing at least one alcoholic hydroxy group and being free from other substituents capable of reacting with methylol groups.

3. An oxidatively drying preparation in which the drying ingredient consists of a hardenable formaldehyde condensation product of an aminotriazine containing at least two $NH_2$-groups and a metallic drier, in which condensation product at least two methylol groups per mol of aminotriazine are etherified with allyl groups and at least one further methylol group is etherified with another monohydric aliphatic alcohol.

4. An oxidatively drying preparation which dries even at room temperature, in which the drying ingredient consists of a hardenable formaldehyde condensation product of an aminotriazine containing at least two $NH_2$-groups and a drier of a metal of the iron group of the periodic system, in which condensation product at least two methylol groups per mol of aminotriazine are etherified with allyl groups.

5. An oxidatively drying preparation in which the drying ingredient consists of a hardenable formaldehyde condensation product of melamine and a metallic drier, in which condensation product at least two methylol groups per mol of melamine are etherified with allyl groups.

6. An oxidatively drying preparation in which the drying ingredient consists of a hardenable formaldehyde condensation product of melamine and a metallic drier, in which condensation product at least two methylol groups per mol of melamine are etherified with allyl groups and at least one further methylol group is etherified with another substance containing at least one alcoholic hydroxy group and being free from other substituents capable of reacting with methylol groups.

7. An oxidatively drying preparation in which the drying ingredient consists of a hardenable formaldehyde condensation product of melamine and a metallic drier, in which condensation product at least two methylol groups per mol of melamine are etherified with allyl groups and at least one further methylol group is etherified with another monohydric aliphatic alcohol.

8. An oxidatively drying preparation which dries even at room temperature, in which the drying ingredient consists of a hardenable formaldehyde condensation product of melamine and a drier of a metal of the iron group of the periodic system, in which condensation product at least two methylol groups per mol of melamine are etherified with allyl groups.

9. An oxidatively drying preparation which dries even at room temperature, in which the drying ingredient consists of a hardenable formaldehyde condensation product of melamine and a cobalt drier, in which condensation product at least two methylol groups per mol of melamine are etherified with allyl groups.

References Cited in the file of this patent

UNITED STATES PATENTS

| | | |
|---|---|---|
| 2,197,357 | Widmer et al. | Apr. 16, 1940 |
| 2,454,495 | Widmer et al. | Nov. 23, 1948 |
| 2,477,548 | Roach | July 26, 1949 |
| 2,508,876 | Scott et al. | May 23, 1950 |
| 2,527,853 | Roach et al. | Oct. 31, 1950 |
| 2,585,035 | Roach et al. | Feb. 12, 1952 |
| 2,619,476 | Malinowski | Nov. 25, 1952 |
| 2,623,864 | Wrigley et al. | Dec. 30, 1952 |